(12) United States Patent
Hernandez

(10) Patent No.: US 6,796,584 B1
(45) Date of Patent: Sep. 28, 2004

(54) CHILD CAR SEAT RESTRAINT ASSEMBLY

(76) Inventor: Steven J. Hernandez, 18605 Rd. 240, Terrabella, CA (US) 93270

(*) Notice: Subject to any disclaimer, the term of this patent is extended or adjusted under 35 U.S.C. 154(b) by 125 days.

(21) Appl. No.: 10/274,553

(22) Filed: Oct. 21, 2002

(51) Int. Cl.$^7$ .............................................. B60R 22/48
(52) U.S. Cl. ...................... 280/801.1; 2/49.1; 297/464
(58) Field of Search ...................... 280/801.1; 297/464, 297/484, 485, 487, 488, 483

(56) References Cited

U.S. PATENT DOCUMENTS

| | | | | |
|---|---|---|---|---|
| 3,724,452 A | * | 4/1973 | Nitschke ...................... 602/18 |
| 3,968,994 A | * | 7/1976 | Chika .......................... 297/486 |
| 4,613,188 A | * | 9/1986 | Tsuge et al. ............ 297/256.13 |
| 4,682,372 A | * | 7/1987 | Peterson et al. .................. 2/51 |
| 4,754,999 A | * | 7/1988 | Kain ...................... 297/256.14 |
| 5,275,468 A | * | 1/1994 | Vacanti ....................... 297/483 |
| 5,527,094 A | * | 6/1996 | Hiramatsu et al. ........ 297/250.1 |
| 5,641,200 A | * | 6/1997 | Howell ................... 297/256.17 |
| 5,730,498 A | * | 3/1998 | Hanson et al. .............. 297/465 |
| 5,775,772 A | * | 7/1998 | Lefranc .................... 297/250.1 |
| 5,842,740 A | * | 12/1998 | Lefranc .................... 297/250.1 |
| 6,095,613 A | * | 8/2000 | Ostrander et al. .......... 297/467 |
| 6,174,032 B1 | * | 1/2001 | Conaway .................... 297/487 |

* cited by examiner

*Primary Examiner*—Paul N. Dickson
*Assistant Examiner*—Toan C To

(57) ABSTRACT

A child car seat restraint assembly for providing a safety restraint system for children especially between the ages of 3 and 6 years old. The child car seat restraint assembly includes a chest apron including a plate having a front side, top and bottom edges and rounded corners, and also including length-adjustable straps being attached to said top and bottom edges, and further including length adjustment members being movably disposed about the length-adjustable straps; and also includes a shoulder strap securement assembly being attached to the front side of the plate; and further includes a car seat attachment assembly including a length-adjustable strap member being attached to the plate, and also including a connector tongue being attached to the length-adjustable strap member and being adapted to removably fasten to a car seat, and further including a length-adjusting member being movably disposed about the length-adjustable strap member; and also includes a cape assembly including first snap-like fasteners being attached to the length-adjustable straps, and also including a cape member being fastenable to the first snap-like fasteners.

11 Claims, 2 Drawing Sheets

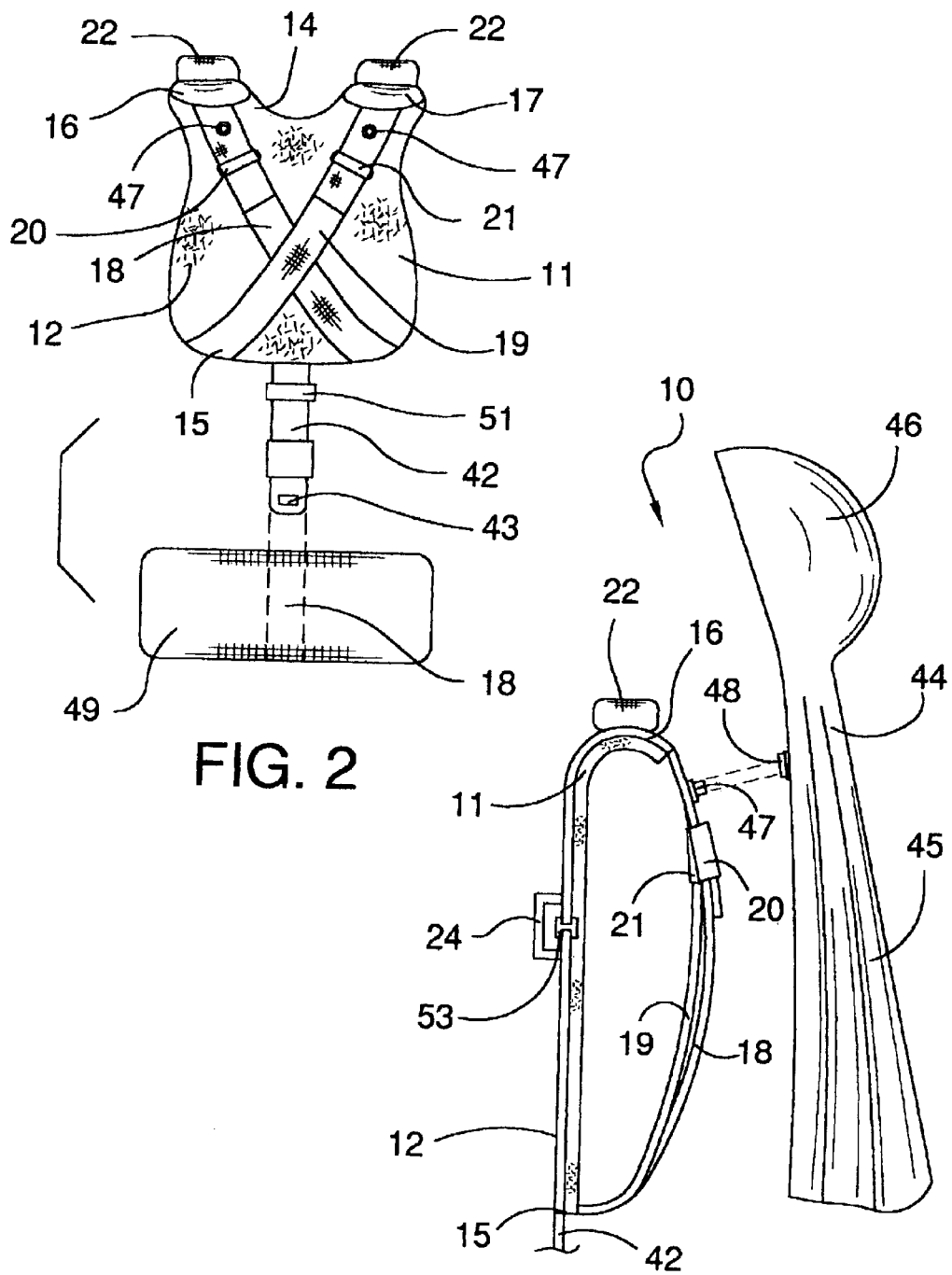

CHILD CAR SEAT RESTRAINT ASSEMBLY

BACKGROUND OF THE INVENTION

1. Field of the Invention

The present invention relates to safety belts for passengers and more particularly pertains to a new child car seat restraint assembly for providing a safety restraint system for children especially between the ages of 3 and 6 years old.

2. Description of the Prior Art

The use of safety belts for passengers is known in the prior art. More specifically, safety belts for passengers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,842,740; 4,754,999; 4,613,188; 5,775,772; 5,437,061; and Des. 427,785.

While these devices fulfill their respective, particular objectives and requirements, the aforementioned patents do not disclose a new child car seat restraint assembly. The prior art includes straps, buckles, and belts used to restrain a child in a car seat.

SUMMARY OF THE INVENTION

The general purpose of the present invention, which will be described subsequently in greater detail, is to provide a new child car seat restraint assembly which has many of the advantages of the safety belts for passengers mentioned heretofore and many novel features that result in a new child car seat restraint assembly which is not anticipated, rendered obvious, suggested, or even implied by any of the prior art safety belts for passengers, either alone or in any combination thereof. The present invention includes a chest apron including a plate having a front side, top and bottom edges and rounded corners, and also including length-adjustable straps being attached to said top and bottom edges, and further including length adjustment members being movably disposed about the length-adjustable straps; and also includes a shoulder strap securement assembly being attached to the front side of the plate; and further includes a car seat attachment assembly including a length-adjustable strap member being attached to the plate, and also including a connector tongue being attached to the length-adjustable strap member and being adapted to removably fasten to a car seat, and further including a length-adjusting member being movably disposed about the length-adjustable strap member; and also includes a cape assembly including first snap-like fasteners being attached to the length-adjustable straps, and also including a cape member being fastenable to the first snap-like fasteners. None of the prior art includes the combination of elements of the present invention.

There has thus been outlined, rather broadly, the more important features of the child car seat restraint assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new child car seat restraint assembly which has many of the advantages of the safety belts for passengers mentioned heretofore and many novel features that result in a new child car seat restraint assembly which is not anticipated, rendered obvious, suggested, or even implied by any of the prior art safety belts for passengers, either alone or in any combination thereof.

Still another object of the present invention is to provide a new child car seat restraint assembly for providing a safety restraint system for children especially between the ages of 3 and 6 years old.

Still yet another object of the present invention is to provide a new child car seat restraint assembly that is easy and convenient to use.

Even still another object of the present invention is to provide a new child car seat restraint assembly that appropriately and safely restrains the entire torso of a child.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a rear elevational view of the present invention.

FIG. 4 is a side elevational view of the present invention.

DESCRIPTION OF THE PREFERRED EMBODIMENT

Figure 1:
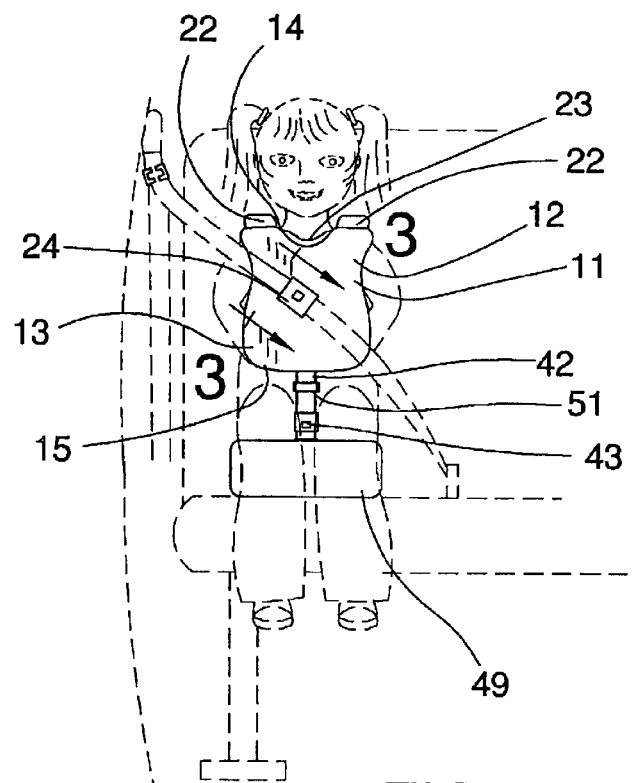
FIG. 1 is a front elevational view of a new child car seat restraint assembly according to the present invention.
Figure 3:
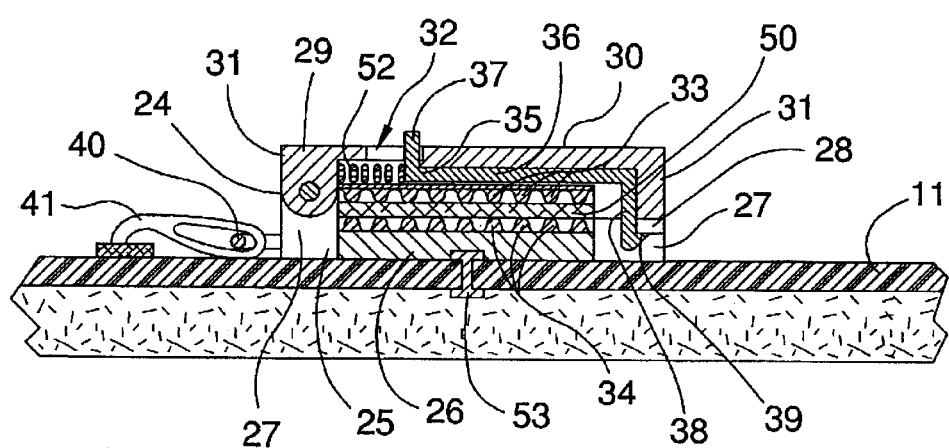
FIG. 3 is a cross-sectional view of a shoulder strap securement member of the present invention.

With reference now to the drawings, and in particular to FIGS. 1 through 4 thereof, a new child car seat restraint assembly embodying the principles and concepts of the present invention and generally designated by the reference numeral 10 will be described.

As best illustrated in FIGS. 1 through 4, the child car seat restraint assembly 10 generally comprises a chest apron 11 including a plate 12 having a front side 13, top and bottom edges 14,15 and rounded corners, and also including length-adjustable straps 18,19 being conventionally attached to the top and bottom edges 14,15, and further including length adjustment members 20,21 being movably disposed about the length-adjustable straps 18,19. The plate 12 includes curved shoulder supported portions 16,17 integrally extending from the top edge 14 thereof and being spaced apart with a curved neck-receiving portion disposed therebetween. The curved shoulder supported portions 16,17 are adapted to rest upon a user's shoulder. The chest apron 11 includes neck pad members 22 being conventionally attached upon the curved shoulder supported portions 16,17, and also includes a chin pad member 23 being conventionally attached to the neck-receiving portion of the plate 12.

A shoulder strap securement assembly is conventionally attached to the front side 13 of the plate 12. The shoulder strap securement assembly includes at least one clamp member 24 being conventionally attached to the plate 12 and including a lower jaw member 25 being pivotally attached to the plate with a swivel member 53 which has a shaft potion and annular flanged portions and which is disposed through said plate 12 and through said lower jaw member 25, and also including an upper jaw member 31 being hingedly attached to the lower jaw member 25, and also having upper teeth 33 being conventionally attached to the upper jaw member 31, and further having lower teeth 34 being conventionally attached to the lower jaw member 25, and also having a latch 35 being conventionally attached to the upper jaw member 31 and being lockable to the lower jaw member 25 to securely lock the upper jaw member 31 upon the lower jaw member 25, and further having a spring 52 biasing the latch 35 into a lockable position. The shoulder strap securement assembly also includes a swiveling rivet 40 being conventionally attached to the lower jaw member 25, and further including a flexible line 41 being conventionally connected to the swiveling rivet 40 and being securely and conventionally attached to the plate 12. The lower jaw member 25 includes a bottom wall 26 and side walls 27 and a rim 28 being disposed along a top edge of at least one of the side walls 27. The upper jaw member 29 includes a top wall 30 having a slot 32 being disposed therethrough, and also having side walls 31 with one of the side walls 31 thereof being hingedly attached to one of the side walls 27 of the lower jaw member 25. The latch 35 has an elongate main portion 36 which is movably and conventionally secured to an underside of the top wall 30 of the upper jaw member 29, and also has a handle portion 37 which is angled relative to the elongate main portion 36 and which movably extends through the slot 32 of the top wall 30, and further has catch portion 38 which is angled relative to the elongate main portion 36 and which has a flange 39 integrally extending outwardly near an end thereof and being engagable to the rim 28 of the lower jaw member 25 to lock the upper jaw member 29 upon the lower jaw member 25. The spring 52 is securely and conventionally attached to one of the side walls 31 of the upper jaw member 29 and to the handle portion 37 of the latch 35. The swiveling rivet 40 is conventionally attached to an exterior of one of the side walls 27 of the lower jaw member 25, and the flexible line 41 has a looped end which is looped about the swiveling rivet 40. The upper teeth 33 are securely and conventionally attached to the underside of the top wall 30 of the upper jaw member 29, and the lower teeth 34 are securely and conventionally attached to a top side of the bottom wall 26 of the lower jaw member 25 with the upper and lower teeth 33,34 in cooperation being adapted to engage the shoulder strap 50 therebetween.

A car seat attachment assembly includes a length-adjustable strap member 42 being conventionally attached to the plate 12, and also includes a connector tongue 43 being conventionally attached to the length-adjustable strap member 42 and being adapted to removably fasten to a car or booster seat 49, and further includes a length-adjusting member 51 being movably disposed about the length-adjustable strap member 42.

A cape assembly includes first snap-like fasteners 47 being conventionally attached to the length-adjustable straps 18,19, and also includes a cape member 44 being fastenable to the first snap-like fasteners 47. The cape member 44 includes a torso portion 45 and a hood portion 46, and also includes second snap-like fasteners 48 being conventionally attached to the torso portion 45 and being fastenable to the first snap-like fasteners 47 to secure the cape member 44 about a child.

In use, the user places the child upon the booster seat 49 and places and secures the chest apron 11 about the child with the shoulder strap 50 being secured between the upper and lower teeth 33,34 of the clamp member so that the child is adequately restrained and protected from being hurt.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the child car seat restraint assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child car seat restraint assembly comprising:
    a chest apron including a plate having a front side, top and bottom edges and rounded corners, and also including length-adjustable straps being attached to said top and bottom edges, and further including length adjustment members being movably disposed about said length-adjustable straps;
    a shoulder strap securement assembly being attached to said front side of said plate;
    a car seat attachment assembly including a length-adjustable strap member being attached to said plate, and also including a connector tongue being attached to said length-adjustable strap member and being adapted to removably fasten to a car or booster seat, and further including a length-adjusting member being movably disposed about said length-adjustable strap member; and
    a cape assembly including first snap fasteners being attached to said length-adjustable straps, and also including a cape member being fastenable to said first snap fasteners.

2. A child car seat restraint assembly as described in claim 1, wherein said plate includes curved shoulder supported portions extending from said top edge thereof and being spaced apart with a curved neck-receiving portion disposed therebetween, said curved shoulder supported portions being adapted to rest upon a user's shoulder.

3. A child car seat restraint assembly as described in claim 2, wherein said chest apron includes neck pad members being attached upon said curved shoulder supported portions, and also includes a chin pad member being attached in said neck-receiving portion of said plate.

4. A child car seat restraint assembly as described in claim 3, wherein said shoulder strap securement assembly includes at least one clamp member being attached to said plate and including a lower jaw member being pivotally attached to said plate with a swivel member which has a shaft potion and annular flanged portions and which is disposed through said plate and through said lower jaw member, and also including an upper jaw member being hingedly attached to said lower jaw member, and also having upper teeth being attached to said upper jaw member, and further having lower teeth being attached to said lower jaw member, and also having a latch being attached to said upper jaw member being lockable to said lower jaw member to securely lock said upper jaw member upon said lower jaw member, and further having a spring biasing said latch into a lockable position, said shoulder strap securement assembly also including a swiveling rivet being attached to said lower jaw member, and further including a flexible line being connected to said swiveling rivet and being securely attached to said plate.

5. A child car seat restraint assembly as described in claim 4, wherein said lower jaw member includes a bottom wall and side walls and a rim being disposed along a top edge of at least one of said side walls.

6. A child car seat restraint assembly as described in claim 5, wherein said upper jaw member includes a top wall having a slot being disposed therethrough, and also having side walls with one of said side walls thereof being hingedly attached to one of said side walls of said lower jaw member.

7. A child car seat restraint assembly as described in claim 6, wherein said latch has an elongate main portion which is movably secured to an underside of said top wall of said upper jaw member, and also has a handle portion which is angled relative to said elongate main portion and which movably extends through said slot of said top wall, and further has catch portion which is angled relative to said elongate main portion and which has a flange extending outwardly near an end thereof and being engagable to said rim of said lower jaw member to lock said upper jaw member upon said lower jaw member.

8. A child car seat restraint assembly as described in claim 7, wherein said spring is securely attached to one of said side walls of said upper jaw member and to said handle portion of said latch.

9. A child car seat restraint assembly as described in claim 8, wherein said swiveling rivet is attached to an exterior of one of said side walls of said lower jaw member, and said flexible line has a looped end which is looped about said eyelet.

10. A child car seat restraint assembly as described in claim 8, wherein said upper teeth are securely attached to said underside of said top wall of said upper jaw member, and said lower teeth are securely attached to a top side of said bottom wall of said lower jaw member, said upper and lower teeth in cooperation being adapted to engage the shoulder strap securement assembly therebetween.

11. A child car seat restraint assembly as described in claim 1, wherein said cape member includes a torso portion and a hood portion, and also includes second snap-like fasteners being attached to said torso portion and being fastenable to said first snap-like fasteners to secure said cape member about a child.

* * * * *